US000001537H

United States Statutory Invention Registration [19]

[11] Reg. Number: H1537

Eapen et al.

[45] Published: Jun. 4, 1996

[54] PERFLUORINATED POLYETHER LUBRICANT COMPOSITIONS

[75] Inventors: Kalathil C. Eapen, Beavercreek; Loomis S. Chen, Fairborn, both of Ohio

[73] Assignee: The United States of America as represented by the Secretary of the Air Force, Washington, D.C.

[21] Appl. No.: 348,000

[22] Filed: Dec. 1, 1994

[51] Int. Cl.[6] ..... C10M 135/28

[52] U.S. Cl. ..... 252/54

[58] Field of Search ..... 252/54

[56] References Cited

U.S. PATENT DOCUMENTS

| | | | |
|---|---|---|---|
| 3,666,769 | 5/1972 | Jones et al. | 260/304 |
| 3,715,378 | 2/1973 | Sianesi et al. | 260/463 |
| 4,011,267 | 3/1977 | Tamborski et al. | 260/606.5 P |
| 4,043,926 | 8/1977 | Snyder et al. | 252/49.9 |
| 4,097,388 | 6/1978 | Snyder et al. | 252/49.9 |
| 4,120,863 | 10/1978 | Tamborski et al. | 260/307 D |
| 4,267,348 | 5/1981 | Tamborski et al. | 548/330 |
| 4,454,349 | 6/1984 | Tamborski et al. | 568/13 |
| 4,681,693 | 6/1987 | Gavezotti et al. | 252/49.9 |
| 5,124,058 | 6/1992 | Corti et al. | 252/54 |
| 5,169,548 | 12/1992 | Strepparola et al. | 252/51.5 R |
| 5,302,760 | 4/1994 | Gschwender et al. | 568/581 |

OTHER PUBLICATIONS

Christian, John B. "Benzoxazole and benzothiazole anti--rust greases," Lubr. Eng., 36(11), pp. 639–642.

*Primary Examiner*—Charles T. Jordan
*Assistant Examiner*—Meena Chelliah
*Attorney, Agent, or Firm*—Charles E. Bricker; Thomas L. Kundert

[57] ABSTRACT

A lubricant composition comprises a perfluorinated polyalkylether base fluid (PFPAE) and an oxidation-corrosion inhibiting amount of a perfluoro-substituted benzothiazole or bis-benzothiazole. The benzothiazole compound additive exhibits excellent solubility in the base fluid and possesses outstanding low volatility characteristics. As a result, the lubricant composition functions as a noncorrosive, stable material suitable for long term applications over a wide temperature range (−65° F. to >600° F.) in an oxidative environment.

The perfluoro-substituted benzothiazoles and bis-benzothiazoles have the formula: Q—$R_f$ or Q—$R_f'$—Q, wherein Q is

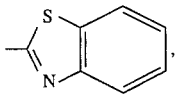

wherein $R_f$ is a linear or branched perfluoroalkylether group containing at least one ether linkage and $R_f'$ is a linear or branched perfluoroalkyleneeher group containing at least one ether linkage.

In formulating the lubricant composition of this invention, an oxidation-corrosion inhibiting amount of the substituted benzothiazole is dissolved in the PFPAE base fluid. The amount of the benzothiazole employed generally ranges from about 0.05 to 5.0 weight percent, preferably about 0.5 to 2.0 weight percent, based on the weight of the base fluid. This provides a lubricant containing an amount of oxidation-corrosion inhibiting additive that is adequate for long term applications at elevated temperatures while maintaining excellent formulation stability after storage at low temperatures for long periods of time.

14 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PERFLUORINATED POLYETHER LUBRICANT COMPOSITIONS

RIGHTS OF THE GOVERNMENT

The invention described herein may be manufactured and used by or for the Government of the United States for all governmental purposes without the payment of any royalty.

BACKGROUND OF THE INVENTION

This invention relates to oxidation-corrosion inhibitors for perfluoropolyalkylether fluids.

Highly fluorinated compounds have long been of interest because of their excellent potential for high temperature applications. Fluids based on perfluoropolyalkylethers (PFPAE) have, in addition to high thermal and oxidative stability, a wide liquid range which make them ideal candidates for aerospace applications. These fluids consist essentially of a mixture of fluorinated polyethers. These fluids have the general formulae:

$$R_fO(Z)_mR_f$$

wherein $R_f$ is a lower perfluoroalkyl group, such as $CF_3$, $C_2F_5$, $C_3F_7$ and the like, wherein Z is $—CX_2CX_2O—$, $—CX_2CX_2CX_2O—$ or $—CX_2OCX_2CX_2O—$, where X is —F, $—CF_3$, $—C_2F_5$ and the like, and m has a value of 5 to 50; or $$R_fO(Z)_n(Y)_pR_f$$

wherein Y is —CFXO—, wherein X, $R_f$ and Z are as previously defined, and n and p are integers whose sum is between 5 and 200 and the ratio of p to n is between 0.1 and 10, and wherein the Z and Y units are statistically distributed along the PFPAE chain. Commercial base fluids have been available for some time, for example, Krytox$^R$ (DuPont), Fomblin$^R$ (Ausimont), Demnum$^R$ (Daikin) and the like. Their practical utility in aerospace and military applications has been hampered by the wear and corrosion of certain metal components exposed to these base fluids under extreme conditions.

Deficiencies in base fluids are generally removed and the performance of the fluids improved by the use of additives. Conventional additives developed for the improvement of a variety of specific properties of hydrocarbon base fluids are generally not suitable for perfluorinated fluids. These conventional additives are not soluble in perfluorinated fluids and are ineffective. One way of overcoming this incompatibility is to synthesize compounds containing fluoroalkylether groups plus selected functional groups for specific activity. Although this approach may make the compound soluble in a fluorinated base fluid, mere replacement of hydrocarbon groups with fluorocarbon groups can change the useful properties of the additive itself by changing the properties of the critical functional group present in the additive. These difficulties are well known to those familiar with the art. In spite of these difficulties, a few useful additives have been developed for perfluorinated fluids. One such example is the development of PFAE substituted triphenylphosphines, C. E. Snyder, Jr. and C. Tamborski, U.S. Pat. No. 4,097,388. These additives, when dissolved in PFPAE fluids, have significantly reduced the corrosion of certain metal components exposed to the fluid at high temperatures in an oxidative environment.

Jones et al, U.S. Pat. No. 3,666,769, issued May 30, 1972, disclose certain substituted benzothiazoles having in their 2-position a perfluoroalkyl, pefluoroaryl, perfluoro(alkoxyalkyl), perfluoro(aryloxyalkyl) or a polyoxyperfluoroalkylene substituent free of either olefinic or acetylenic unsaturation. These substituted benzothiazoles are very stable to high temperatures and are useful as turbine fluids, hydraulic fluids, lubricants, solvents and heat-transfer fluids.

We have discovered that these substituted benzothiazoles can be employed in small quantities to enhance the stability of fluorinated base fluids.

Accordingly, it is an object of this invention to provide perfluorinated fluids having improved stability properties.

Another object of this invention is to provide novel stability enhancing additives for perfluoropolyalkylethers.

Other objects and advantages of the invention will be apparent to those skilled in the art.

SUMMARY OF THE INVENTION

The present invention resides in a lubricant composition comprising a perfluorinated polyalkylether base fluid and an oxidation-corrosion inhibiting amount of a perfluoro-substituted benzothiazole. The benzothiazole compound additive exhibits excellent solubility in the base fluid and possesses outstanding low volatility characteristics. As a result, the lubricant composition functions as a noncorrosive, stable material suitable for long term applications over a wide temperature range (−65° F. to >600° F.) in an oxidative environment.

The perfluoro-substituted benzothiazoles used as corrosion inhibitors in the lubricant composition of this invention have the following formula:

$$Q—R_f \text{ or } Q—R_f'—Q$$

wherein Q is

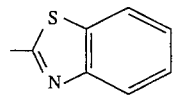

wherein $R_f$ is a linear or branched perfluoroalkylether group containing at least one ether linkage and $R_f'$ is a linear or branched perfluoroalkyleneether group containing at least one ether linkage. $R_f$ and $R_f'$ preferably contain at least two ether linkages.

Examples of the perfluoroalkyleher and perfluoroalkyleneether groups include the following wherein $R_f$ can be $$C_3F_7O(\underset{\underset{CF_3}{|}}{C}FCF_2O)_xCF(\underset{\underset{CF_3}{|}}{C}F)— \quad \text{or} \quad C_2F_5O(C_2F_4O)_xCF_2—$$

wherein x has a value of 1 to 20, preferably 3 to 8; and wherein $R_f'$ can be $$—CF(OCF_2CF)_yO(CF_2)_xO(CFCF_2O)_zCF—$$
$$\quad\quad |\quad\quad\quad |\quad\quad\quad\quad\quad\quad |\quad\quad\quad |$$
$$\quad CF_3 \quad CF_3 \quad\quad\quad\quad CF_3 \quad CF_3$$

wherein x is as defined above, and y and z each has a value of 1 to 20, preferably 1 to 5.

In formulating the lubricant composition of this invention, an oxidation-corrosion inhibiting amount of the substituted benzothiazole is dissolved in the PFPAE base fluid. The amount of the benzothiazole employed generally ranges from about 0.05 to 5.0 weight percent, preferably about 0.5 to 2.0 weight percent, based on the weight of the base fluid. This provides a lubricant containing an amount of oxidation-corrosion inhibiting additive that is adequate for long term applications at elevated temperatures while maintaining excellent formulation stability after storage at low temperatures for long periods of time.

The benzothiazole-substituted perfluoroalkylethers and perfluoroalkyleneethers are prepared by procedures known in the art. One convenient synthesis is given by Jones et al, U.S. Pat. No. 3,666,769, as shown by the following reaction sequence:

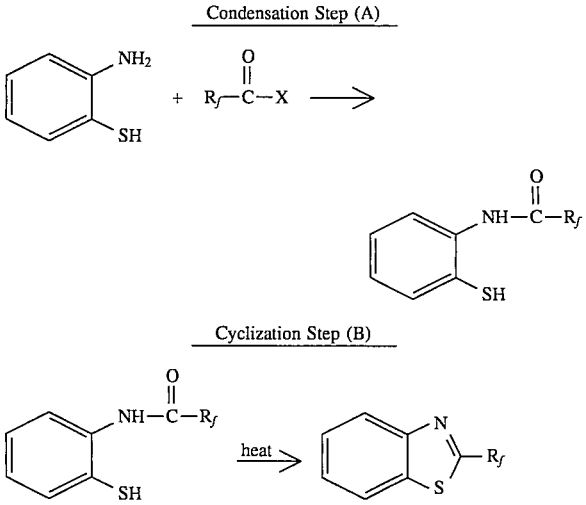

The perfluoroalkyleneether bis-benzothiazole can be prepared in similar manner.

The following examples illustrate the invention:

EXAMPLE I Synthesis of Q—$R_f'$—Q, wherein $R_f'$ is $$-\underset{CF_3}{CF}(OCF_2\underset{CF_3}{CF})_yO(CF_2)_5O(\underset{CF_3}{CF}CF_2O)_z\underset{CF_3}{CF}-$$

wherein y+z is 3.

To a solution of 11.7 g (93.2 mmol) of 2-aminobenzenethiol in 75 ml of anhydrous diethyl ether was added 25.0 g (23.3 mmol) of the diacid fluoride $$FC(O)-\underset{CF_3}{CF}(OCF_2\underset{CF_3}{CF})_yO(CF_2)_5O(\underset{CF_3}{CF}CF_2O)_z\underset{CF_3}{CF}-C(O)F,$$

wherein y+ z is 3, over a period of 30 minutes. A mild exotherm was observed during the addition. The reaction mixture was refluxed for 3 hours with stirring. Stirring was then continued at room temperature for an additional 20 hours. At the end of this period, the amine salts had separated as a white solid. This solid was filtered off and the filtrate was treated with 2N HCl (3×100 ml) and phase separated. The ether layer was washed with water (2×100 ml), phase separated, dried over anhydrous magnesium sulfate and the solvent removed. 28 g of crude product was obtained as a yellow liquid.

The crude product (28 g) was heated with 15 g of polyphosphoric acid (PPA) at 200–250° C. for 2 hours, while stirring the mixture vigorously. Distillation of the reaction mixture yielded 23 g of the bisbenzothiazole (yield, 79%; b.p. 197° C./0.03 mm Hg). The infrared spectrum of the product did not show any absorption due to NH or C=O groups and was consistent with the expected structure.

EXAMPLE II

A lubricant composition was formulated using a base fluid of the formula $$F(CF_2CF_2O)_r(CF_2O)_qR_f$$

wherein $R_f$ is a perfluoroalkyl group of unspecified length, but probably having 1 or 2 carbon atoms, and q and r are integers such that the fluid has a kinematic viscosity of 17.56 cSt. at 100° F. This base fluid was Fomblin Z, manufactured by Monticatini Edison of Milan, Italy, and was from the Brayco line of perfluoroalkylether fluids. One weight percent of a benzothiazole-substituted perfluoroalkylether of the formula:

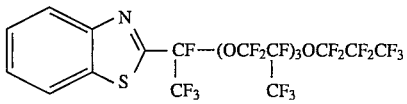

synthesized following the procedure given in Jones et al, above, was mixed into the base fluid.

A series of ferrous alloy coupons were immersed in the the inhibited fluid composition prepared above. For comparison, tests were also carried out in which specimens were immersed in base fluid which did not contain the oxidation-corrosion inhibiting additive. Air was bubbled through the Fomblin Z, both inhibited and not inhibited, at the rate of one liter per hour for 24 hours. Tests were conducted at constant temperatures of 525° F., 550° F. and 575° F. The alloy specimens as well as the test apparatus were weighed before and after each test. The data obtained are set forth in Table I, below.

TABLE I

| | BASE FLUID | FORMULATED FLUID | | |
|---|---|---|---|---|
| PROPERTIES | 525° F. | 525° F. | 550° F. | 575° F. |
| Kinematic Viscosity Change at 100° F. (%) | −72.8 | +0.50 | +0.20 | +0.86 |
| Acid Number Change (mg KOH/g) | 36.2 | <0.05 | <0.05 | <0.05 |
| Fluid Loss (wt. %) | 48.7 | 0.00 | 0.00 | 0.00 |
| Metal Weight Change ($mg/cm^2$) | | | | |
| 4140 Steel | +0.07 | −0.01 | +0.13 | +0.53 |
| 52100 Bearing Steel | +0.13 | +0.06 | +0.04 | +0.02 |
| 410 Stainless Steel | −0.19 | +0.05 | +0.04 | 0.00 |
| M-50 Tool Steel | +0.08 | +0.08 | +0.04 | +0.65 |
| 440C Stainless Steel | +0.14 | 0.00 | −0.05 | −0.03 |
| Fluid Appearance | Clear | Clear | Clear yellow | Clear yellow |

EXAMPLE III

A lubricant composition was formulated using a base fluid of the formula $$F(\underset{CF_3}{CF}CF_2O)_sR_f$$

wherein $R_f$ is a perfluoroalkyl group of unspecified length, but probably having 2 carbon atoms, and s is an integer such that the fluid has a kinematic viscosity of 282 cSt. at 100° F. This base fluid was Krytox 143 AC fluid, a produce of E I dupont de Nemours Co., Wilmington, Del. One weight percent of a benzothiazole-substituted perfluoroalkylether of the formula:

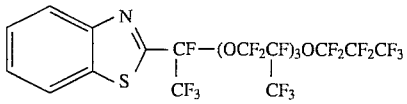

was mixed into the base fluid.

A series of ferrous alloy coupons were immersed in the the inhibited fluid composition prepared above. For comparison, tests were also carried out in which specimens were immersed in base fluid which did not contain the oxidation-corrosion inhibiting additive. Air was bubbled through the Krytox 143 AC, both inhibited and not inhibited, at the rate of one liter per hour for 24 hours. Tests were conducted at constant temperatures of 600° F. and 625° F. The alloy specimens as well as the test apparatus were weighed before and after each test. The data obtained are set forth in Table II, below.

TABLE II

| | BASE FLUID | | FORMULATED FLUID | |
|---|---|---|---|---|
| PROPERTIES | 600° F. | 625° F. | 600° F. | 625° F. |
| Kinematic Viscosity Change at 100° F. (%) | +0.27 | −4.71 | +2.90 | +3.90 |
| Acid Number Change (mg KOH/g) | 0.05 | 0.10 | 0.02 | 0.02 |
| Fluid Loss (wt. %) | 10.62 | 22.60 | 0.00 | 0.10 |
| Metal Weight Change (mg/cm²) | | | | |
| 4140 Steel | −0.80 | −5.42 | +0.48 | +0.38 |
| 52100 Bearing Steel | +0.81 | −10.52 | +0.08 | +0.24 |
| 410 Stainless Steel | −5.27 | −7.73 | 0.00 | +0.03 |
| M-50 Tool Steel | −1.14 | −7.78 | +0.04 | +0.67 |
| 440C Stainless Steel | −5.23 | −10.76 | +0.02 | +0.11 |
| Fluid Appearance | Clear with ppt. | Clear with ppt. | Clear straw color | Clear yellow color with fine ppt. |

EXAMPLE IV

A lubricant composition was formulated using the Fomblin Z base fluid referred to in Example II. One weight percent of the bis-benzothiazole prepared in Example I was mixed into the base fluid.

A series of ferrous alloy coupons were immersed in the the inhibited fluid composition prepared above. Air was bubbled through the inhibited fluid at the rate of one liter per hour for 24 hours. Tests were conducted at constant temperatures of 550° F. and 575° F. The alloy specimens as well as the test apparatus were weighed before and after each test. The data obtained are set forth in Table III, below, along with data from Example II, Table I, for the base fluid which did not contain the oxidation-corrosion inhibiting additive.

TABLE III

| | BASE FLUID | FORMULATED FLUID | |
|---|---|---|---|
| PROPERTIES | 525° F. | 550° F. | 575° F. |
| Kinematic Viscosity Change at 100° F. (%) | −72.8 | +0.40 | +1.15 |
| Acid Number Change (mg KOH/g) | 36.2 | <0.00 | 0.00 |
| Fluid Loss (wt. %) | 48.7 | 0.00 | 0.00 |
| Metal Weight Change (mg/cm²) | | | |
| 4140 Steel | +0.07 | 0.00 | +0.24 |
| 52100 Bearing Steel | +0.13 | 0.00 | −0.27 |
| 410 Stainless Steel | −0.19 | 0.00 | 0.00 |
| M-50 Tool Steel | +0.08 | +0.09 | −0.12 |
| 440C Stainless Steel | +0.14 | −0.04 | 0.00 |
| Fluid Appearance | Clear | Clear yellow | Clear yellow |

The data in Tables I-III clearly demonstrate that the lubricant compositions of this invention have little, if any corrosive effect on ferrous alloys. Further, there was insignificant degradation of the base fluids themselves at the elevated temperatures of the tests.

Various modifications may be made to the invention as described without departing from the spirit of the invention or the scope of the appended claims.

We claim:

1. A lubricant composition comprising a perfluorinated polyalkylether base fluid and an oxidation-corrosion inhibiting amount of a perfluoro-substituted benzothiazole.

2. The composition of claim 1 wherein said perfluoro-substituted benzothiazole has the formula Q—$R_f$, wherein Q is

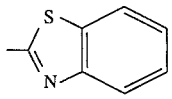

and wherein $R_f$ is a linear or branched perfluoroalkylether group containing at least one ether linkage.

3. The composition of claim 1 wherein the amount of said substituted benzothiazole is about 0.05 to 5.0 weight percent.

4. The composition of claim 1 wherein the amount of said substituted benzothiazole is about 0.5 to 2.0 weight percent.

5. The composition of claim 2 wherein $R_f$ is $$C_3H_7O(\underset{\substack{|\\ CF_3}}{C}FCF_2O)_xC\underset{\substack{|\\ CF_3}}{F}-\quad \text{wherein x has a value of 1 to 20.}$$

wherein x has a value of 1 to 20.

6. The composition of claim 2 wherein $R_f$ is $$C_2F_5O(C_2F_4O)_xCF_2-$$

wherein x has a value of 1 to 20.

7. The composition of claim 5 wherein said base fluid has the general formula $F(CF_2CF_2O)_r(CF_2O)_qR_f$, wherein $R_f$ is a perfluoroalkyl group having 1 or 2 carbon atoms, and q and r are integers such that the fluid has a kinematic viscosity of 17.56 cSt. at 100° F. and wherein said x has a value of 3.

8. The composition of claim 5 wherein said base fluid has the general formula $$F(\underset{\underset{CF_3}{|}}{C}FCF_2O)_sR_f$$

wherein $R_f$ is a perfluoroalkyl group having 1 or 2 carbon atoms, and s is an integer such that the fluid has a kinematic viscosity of 282 cSt. at 100° F. and wherein said x has a value of 3.

9. A lubricant composition comprising a perfluorinated polyalkylether base fluid and an oxidation-corrosion inhibiting amount of a perfluoro-substituted bis-benzothiazole.

10. The composition of claim 9 wherein said perfluoro-substituted bis-benzothiazole has the formula Q—$R_f'$—Q, wherein Q is

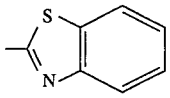

and wherein $R_f'$ is a linear or branched perfluoroalkyleneether group containing at least one ether linkage.

11. The composition of claim 9 wherein the amount of said substituted bis-benzothiazole is about 0.05 to 5.0 weight percent.

12. The composition of claim 9 wherein the amount of said substituted bis-benzothiazole is about 0.5 to 2.0 weight percent.

13. The composition of claim 10 wherein $R_f'$ is $$-\underset{\underset{CF_3}{|}}{C}F(OCF_2\underset{\underset{CF_3}{|}}{C}F)_yO(CF_2)_5O(\underset{\underset{CF_3}{|}}{C}FCF_2O)_z\underset{\underset{CF_3}{|}}{C}F-,$$

wherein y+z is 3.

14. The composition of claim 9 wherein said base fluid has the general formula $F(CF_2CF_2O)_r(CF_2O)_qR_f$, wherein $R_f$ is a perfluoroalkyl group having 1 or 2 carbon atoms, and q and r are integers such that the fluid has a kinematic viscosity of 17.56 cSt. at 100° F. and wherein $R_f'$ is $$-\underset{\underset{CF_3}{|}}{C}F(OCF_2\underset{\underset{CF_3}{|}}{C}F)_yO(CF_2)_5O(\underset{\underset{CF_3}{|}}{C}FCF_2O)_z\underset{\underset{CF_3}{|}}{C}F-,$$

wherein y+ z is 3.

* * * * *